(12) United States Patent
Ho

(10) Patent No.: US 7,367,636 B2
(45) Date of Patent: May 6, 2008

(54) SOLENOID ARMATURE WITH INTEGRATED SPHERICAL SOFT SEAL

(75) Inventor: Thanh Ho, Brunswick, OH (US)

(73) Assignee: Bendix Commercial Vehicle Systems, LLC, Elyria, OH (US)

( * ) Notice: Subject to any disclaimer, the term of this patent is extended or adjusted under 35 U.S.C. 154(b) by 0 days.

(21) Appl. No.: 11/059,717

(22) Filed: Feb. 16, 2005

(65) Prior Publication Data
US 2006/0181144 A1 Aug. 17, 2006

(51) Int. Cl.
*F16K 31/06* (2006.01)
*B60T 8/36* (2006.01)
(52) U.S. Cl. .............................. 303/119.2; 251/129.02
(58) Field of Classification Search .. 303/119.1–119.3; 251/129.02–129.15
See application file for complete search history.

(56) References Cited

U.S. PATENT DOCUMENTS

| | | | | |
|---|---|---|---|---|
| 3,368,789 | A | * | 2/1968 | Helmut ................... 251/129.15 |
| 3,632,081 | A | | 1/1972 | Evans |
| 3,941,428 | A | | 3/1976 | Rothwell et al. |
| 4,096,884 | A | | 6/1978 | Horowitz |
| 4,526,203 | A | | 7/1985 | Leiber |
| 4,649,803 | A | | 3/1987 | Abel |
| 4,763,876 | A | | 8/1988 | Oda et al. |
| 5,234,031 | A | | 8/1993 | Pickett et al. |
| 5,690,397 | A | | 11/1997 | Bayliss et al. |
| 5,771,933 | A | | 6/1998 | Akamatsu et al. |
| 5,879,060 | A | * | 3/1999 | Megerle et al. .......... 303/119.2 |
| 5,921,473 | A | | 7/1999 | Romann |
| 5,947,239 | A | | 9/1999 | Koelzer |
| 5,979,503 | A | | 11/1999 | Abboud et al. |
| 6,065,734 | A | | 5/2000 | Tackett et al. |
| 6,092,781 | A | * | 7/2000 | Hohl et al. ............. 251/129.02 |
| 6,113,066 | A | * | 9/2000 | Hohl et al. ............. 251/129.02 |
| 6,152,420 | A | * | 11/2000 | Hohl .................... 251/129.02 |
| 6,173,730 | B1 | | 1/2001 | Wilson |

(Continued)

FOREIGN PATENT DOCUMENTS

DE 2134067 1/1973

(Continued)

OTHER PUBLICATIONS

International Search Report from PCT/US03/26562.

(Continued)

*Primary Examiner*—Chris Schwartz
(74) *Attorney, Agent, or Firm*—Calfee Halter & Griswold LLP

(57) ABSTRACT

An improved valve for use in a heavy vehicle pneumatic braking and parking system is disclosed. The valve includes a solenoid coil assembly, a valve seat, an armature, and a spring. The solenoid coil includes a pole piece and produces a magnetic field when energized. The valve seat has a valve seat surface and defines a flow passage. The armature has a first end and a second end and includes a spherical shaped elastomeric seal sized to engage the valve seat to block air flow through the flow passage. The spring is engaged around an exterior of the armature and resiliently biases the armature toward the valve seat. When energized, the solenoid coil displaces the armature to an open position away from the valve seat and toward the pole piece to allow air flow through the flow passage.

27 Claims, 7 Drawing Sheets

U.S. PATENT DOCUMENTS

| | | |
|---|---|---|
| 6,209,971 B1 | 4/2001 | Ho et al. |
| 6,224,170 B1 | 5/2001 | Hosoya |
| 6,240,947 B1 | 6/2001 | Ho et al. |
| 6,305,759 B1 | 10/2001 | Ho et al. |
| 6,325,468 B1 | 12/2001 | Ho et al. |
| 6,471,305 B1 | 10/2002 | Leventhal et al. |
| 6,644,350 B1 | 11/2003 | Douglass et al. |
| 6,685,112 B1 | 2/2004 | Hornby et al. |
| 6,705,589 B2 * | 3/2004 | Hofmann et al. ...... 251/129.15 |
| 6,715,700 B2 | 4/2004 | Okamura et al. |
| 6,719,267 B2 | 4/2004 | Torii et al. |
| 6,827,331 B1 * | 12/2004 | Roos ...................... 251/129.15 |
| 6,918,571 B1 * | 7/2005 | Rose ....................... 251/129.18 |
| 2002/0113219 A1 * | 8/2002 | Rembold et al. ....... 251/129.14 |
| 2004/0035478 A1 | 2/2004 | Herbst et al. |
| 2004/0104370 A1 | 6/2004 | Suzuki |

FOREIGN PATENT DOCUMENTS

| | | |
|---|---|---|
| DE | 3942313 | 6/1991 |
| EP | 321 129 | 6/1989 |
| EP | 343849 | 11/1989 |
| EP | 540817 | 5/1993 |
| FR | 2279593 | 2/1976 |
| WO | WO 01/14192 | 3/2001 |

OTHER PUBLICATIONS

Brochure, "Bendix Double Check Valves", 4 pgs., copyright 2004, printed U.S.A., Bendix Commercial Vehicle Systems LLC.

Brochure, "In-Line Single Check Valves", 2 pgs., copyright 2002, printed U.S.A., Bendex Commercial Vehicle Systems LLC.

Brochure, "Bendix SC-3 In-Line Single Check Valves", 2 pgs., copyright 2004, printed U.S.A., Bendix Commercial Vehicle Systems LLC.

In-House MicroPatent Report Search, 2004, 100 pgs.

International Search Report and Written Opinion from PCT/US2005/046179.

* cited by examiner

SOLENOID ARMATURE WITH INTEGRATED SPHERICAL SOFT SEAL

FIELD OF THE INVENTION

The present invention relates to pneumatic brake systems for heavy vehicles and components thereof and more particularly to a new and improved solenoid valve having an integrated spherical soft seal and offering improved sealing performance, simplified machining requirements and reduced manufacturing costs.

BACKGROUND OF THE INVENTION

The trucking industry has for many years used tractor/trailer combinations to transport cargo over roadways. The tractor and the trailer are mechanically coupled together so that the tractor can pull the trailer loaded with cargo in an efficient and cost effective manner. Pneumatic and electrical links between the tractor and the trailer provide a trailer brake system with power and control signals for system operation.

Heavy vehicle pneumatic brake systems use compressed air for all three major braking functions, i.e., parking, service or normal, and emergency. As such, compressed air is constantly used and regenerated in operation of the heavy vehicle. Trailer air brake systems include brake assemblies, brake chambers, and an air reservoir, among other components. The brake assemblies are coupled to the trailer wheels. The brake chambers are coupled to the brake assemblies for selectively engaging and disengaging the brake assemblies to stop and/or prevent rotation of the trailer wheels. The reservoir stores air under pressure provided by the tractor via the pneumatic links. The air under pressure is selectively provided to the brake chambers.

A compressor is used to generate a system tank pressure of 110 psi to 120 psi for supplying the system lines. In most systems, air from the compressor passes through various reservoirs, check valves and safety vales prior to use in a brake chamber located adjacent to an axle. In the field relating to antilock braking systems (hereinafter "ABS"), a modulator valve is situated between a source of air pressure and the brake chamber or actuator. Conventionally, modulators are solenoid operated on/off air valves that are controlled by a system controller. The controller selectively opens and closes the modulator valves to control air flow. Typically, a modulator includes two separate control circuits using solenoids, one for building pressure in the brake chambers and one for exhausting pressurized air from the brake chambers. Modulators are also used in parking and emergency braking functions. In addition to braking systems, solenoid valves are also used in other vehicle pneumatic systems, such as seats, doors and suspensions for example.

Many ABS modulators are known in the art. One exemplary modulator uses essentially high capacity, on/off air valves that incorporate a pair of electrical solenoids for control. The solenoids provide the electro-pneumatic interface or link between the brake controller electronics and the air brake system. The modulator may include a normally open exhaust solenoid and a normally closed supply solenoid, an inlet diaphragm valve and an exhaust diaphragm valve. When a solenoid is energized it either opens or closes thereby causing the exhaust or re-application of air pressure to the brake actuator.

If an antilock event is sensed in an ABS, an electronic control unit sends suitable signals to a solenoid valve assembly (usually a pair of solenoid valves) associated with the modulator. The solenoid valves provide an electro-pneumatic interface between the electronic controller and the air brake system. The antilock controller immediately begins to modify brake application using the modulator to control the impending locked wheel. The coils associated with the respective solenoid valves are energized or de-energized in a predetermined sequence by the controller. As is known in the art, when a solenoid coil is energized, a core or shuttle is moved to either open or close an associated air passage. This movement either opens or closes the exhaust passage or reapplies air pressure to the brake actuator. Each of the solenoid valves is independently controlled by the electronic control unit. By opening and closing the solenoid valves, the antilock controller simulates brake "pumping" at substantially beyond any rate a driver could physically pump the brakes to avoid skidding.

Seal performance and integrity over the operational life of a modulator solenoid valve is highly desired in the industry. In an ABS equipped heavy vehicle, the solenoid valve may be opened and closed up to 5 million times in the forecasted life of the valve. The industry standard permissible leakage rate for valves in the closed position is 2.5 cc/min. The life usage expectancy of a parking modulator solenoid valve is considerably less, i.e., 200.000 cycles. Nevertheless, the seal integrity in a parking system is also desirable. When a truck is parked overnight, an ineffective seal can permit a tank to be undesirably drained of compressed air. This situation requires compulsory compressor use to recharge the tank the following morning prior to use of the heavy duty vehicle. Any loss of operation time of the vehicle may contribute to reduced profits for the trucking company. Seal integrity is important in other pneumatic non-brake systems as well.

The present invention provides a new and improved solenoid valve having an integrated spherical soft seal and offering improved sealing performance, simplified machining requirements and reduced manufacturing costs. The valve features an integrated armature assembly having a biased spring and ball seal. The design eliminates the need for an additional guide member for aligning the armature or a specially molded valve seat insert. Further, the present invention advantageously creates and maintains a seal when the ball seal and valve seat are axially misaligned.

SUMMARY OF THE INVENTION

In an illustrated embodiment of an apparatus applying at least some of the principles of the invention, a valve for use in a pneumatic system of a heavy truck is disclosed. The valve includes an integrated spherical soft seal and offers improved sealing performance, simplified machining requirements and reduced manufacturing costs.

In one embodiment, a solenoid valve including a solenoid coil assembly, a valve seat, an armature and a spring is provided. The solenoid valve has an exit flow passage for releasing pressurized air within a modulator. The solenoid coil assembly includes a pole member and is controllable to produce a magnetic field when energized. The valve seat has a valve seat surface and defines an inlet flow passage. The armature has a first end and a second end. The first end includes a spherical shaped elastomeric seal sized to engage the valve seat to block air flow through the inlet flow passage. The spring is engaged around an exterior of the armature and resiliently biases the armature toward the valve seat when the solenoid coil assembly is de-energized, in other words, when no magnetic field is generated. In contrast, the armature is pulled to an open position away from the valve seat and toward the pole member when a magnetic field is generated. This movement allows air flow through the inlet flow passage to the exit flow passage.

A method of controlling pressurized air flow within a pneumatic system modulator is also disclosed. The method includes the step of providing a solenoid valve including a valve seat, an armature, a spring and a solenoid coil. The valve seat has a valve seat surface that defines a flow passage. The armature includes a spherical shaped seal sized to engage the valve seat to block air flow through the flow passage. The spring is engaged around an outer longitudinal surface of the armature and biases the armature in a direction of the valve seat surface. A portion of the armature is positioned within a center guide of the solenoid coil. The method further includes the step of generating a magnetic field around the armature by energizing the solenoid coil.

Subsequently, a method step includes pulling the armature in a direction opposite the valve seat to permit air flow through the flow passage. At a time signified by a communication from a controller, the magnetic field is removed to permit the spring to force the armature toward the valve seat surface. Consequently, air flow through the flow passage is blocked with the spherical shaped seal.

Further features and advantages of the invention will become apparent from the following detailed description made with reference to the accompanying drawings.

DETAILED DESCRIPTION OF THE INVENTION

Figure 1:
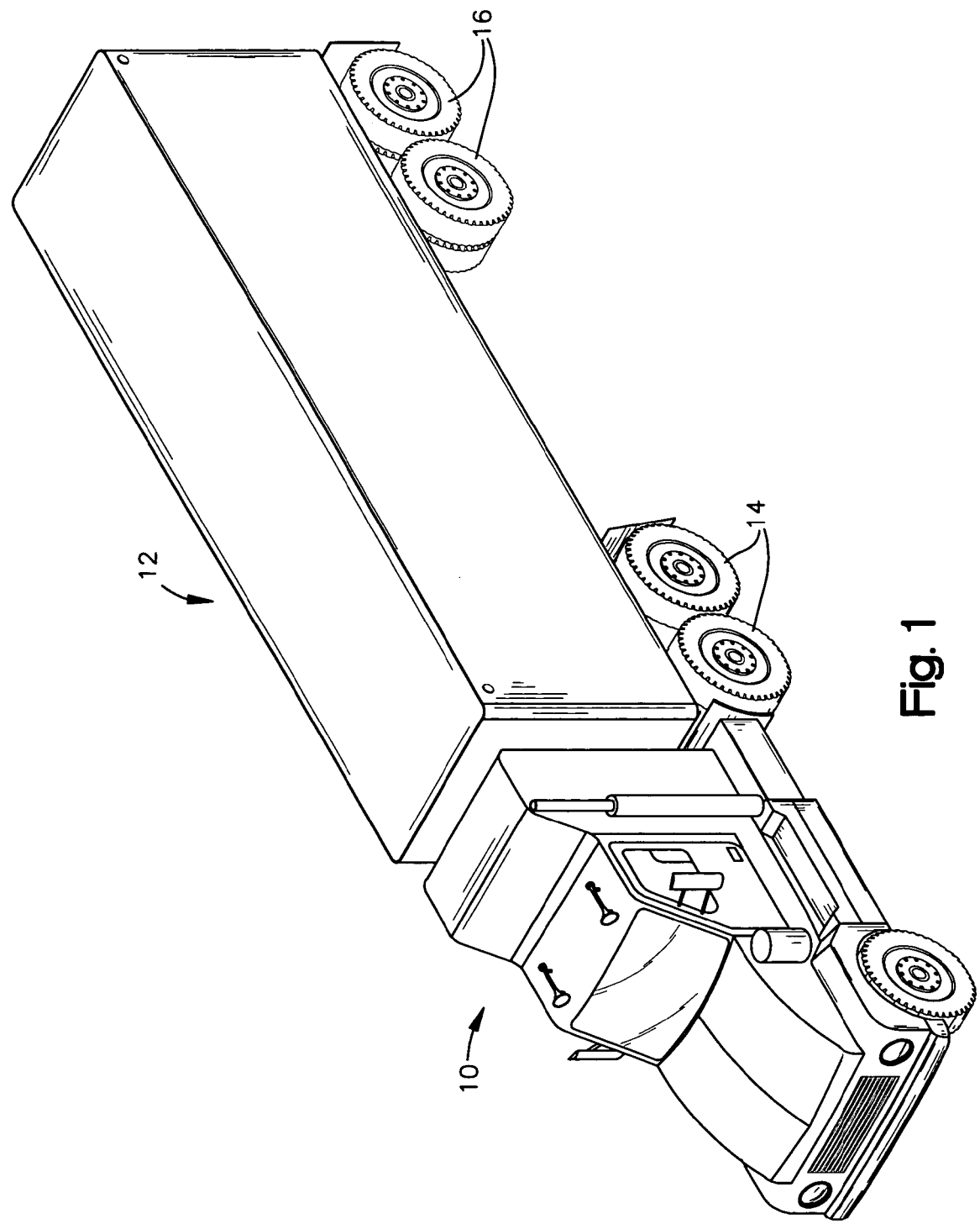
FIG. 1 is a perspective view of a tractor and a trailer.

Referring now to the drawings, a tractor 10 having wheels 14 and a trailer 12 having wheels 16 are illustrated in FIG. 1. The tractor and trailer are shown in a coupled position.

The present invention is directed to a solenoid valve for use in the pneumatic systems of the tractor trailer, including service, parking and emergency braking systems on both tractors and trailers. More particularly, the present application is directed to a new and improved solenoid valve that is disposed within a modulator.

Figure 2:
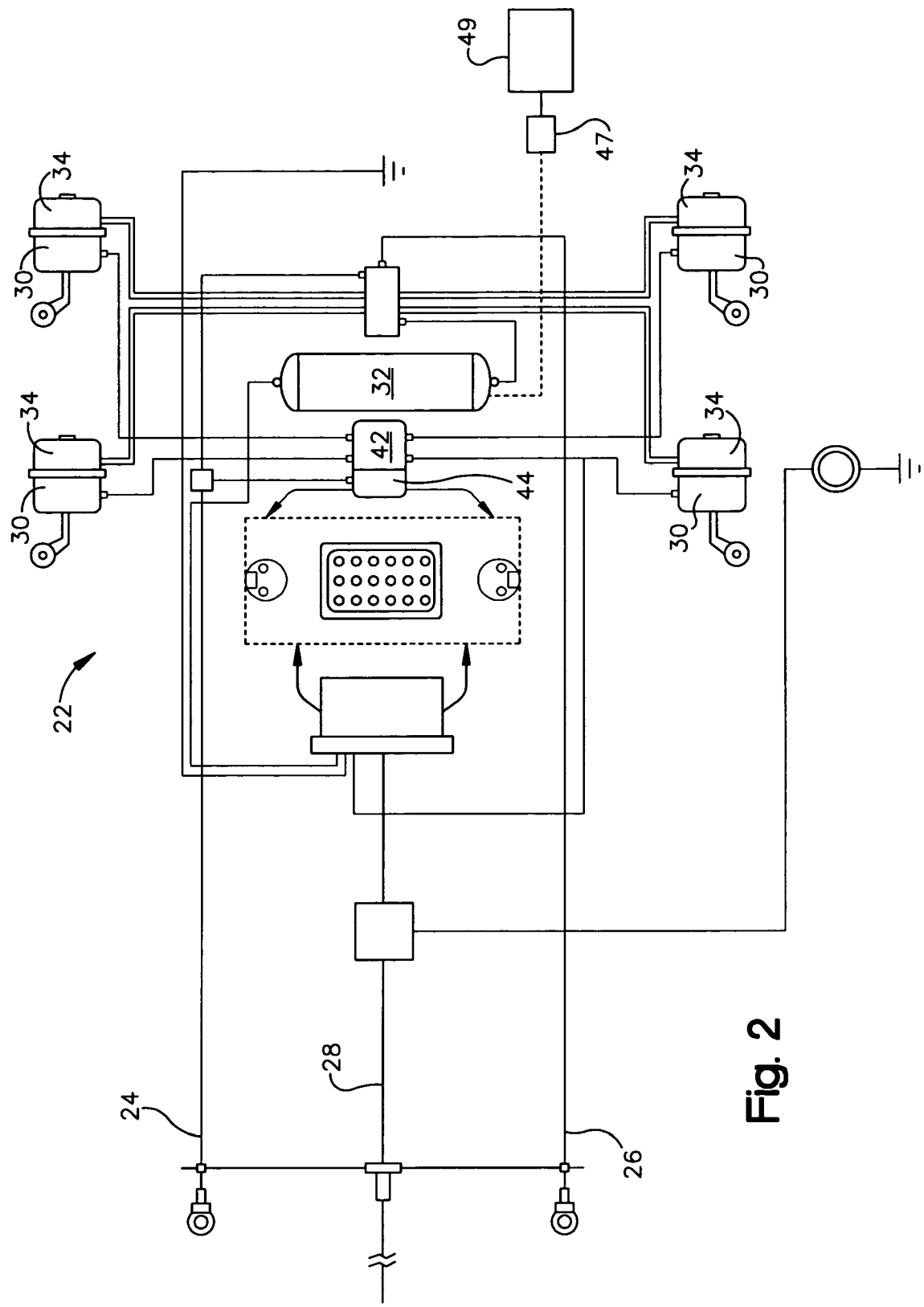
FIG. 2 is a schematic illustration of a portion of a trailer pneumatic system.

FIG. 2 illustrates an example of a trailer pneumatic system 22. It should be apparent to others with ordinary skill in the art that the system 22 illustrated in FIG. 2 is shown for exemplary purposes only and is just one example of a wide variety of systems in which the present invention is applicable. The system 22 includes a brake system as well as another non-braking pneumatic system 49.

As shown in FIG. 2, a control line 24, an air supply line 26 and a wiring harness 28 between the tractor and the trailer provide the pneumatic system with power and control signals that operate, for example, the trailer brake system. The control line 24 selectively communicates pressurized air to control service brake chambers 30. The supply line 26 supplies a reservoir 32 and controls park and emergency brake chambers 34. Brake assemblies (not shown) are coupled to trailer wheels. The brake chambers 30, 34 are coupled to the brake assemblies for selectively engaging and disengaging the brake assemblies to stop or prevent rotation of the trailer wheels.

The illustrated brake system components include a modulator 42 and a controller 44. When the vehicle is moving, the controller processes signals from a wheel speed sensor (not shown) and from the tractor via the wiring harness 28 to control the modulator 42. The modulator selectively supplies the air under pressure to the service brake chambers 30 as directed by the controller to engage and disengage the trailer service brakes, or to the parking brake chambers 34 as directed by the controller to engage and disengage the trailer parking brakes.

As mentioned, the present invention is directed to solenoid valves that may be disposed within a modulator. By electromagnetic actuation, the solenoid valves open and close to control the flow or pressurized air.

The invention is also applicable to non-brake auxiliary air system, such as seats, doors or suspensions. As shown in FIG. 2, the reservoir 32 supplies a valve 47 controlling air flow to a non-brake auxiliary air system 49.

Prior Art Discussion

Figure 3:
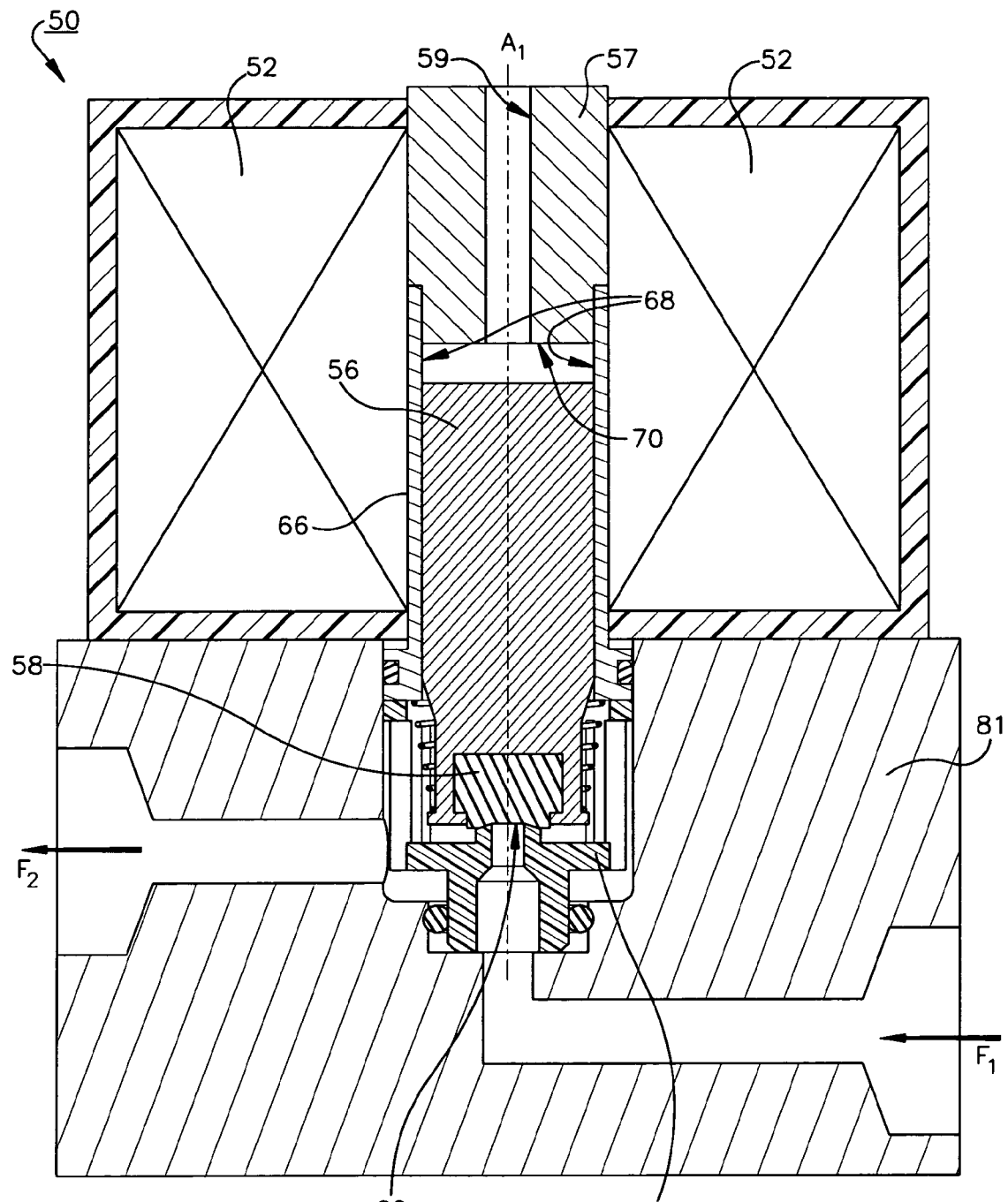
FIG. 3 is a cross sectional view of a prior art solenoid valve.

Numerous prior art solenoid valves warrant discussion. A cross-sectional view of an exemplary prior art solenoid valve 50 is illustrated in FIG. 3. The valve 50 relies upon magnetic forces to open and mechanical spring forces to remain closed. The valve controls the flow of pressurized air from an input path $F_1$ shown to an output path $F_2$ as illustrated in FIG. 3. As shown, the valve assembly 50 is in a closed position.

Figure 6:
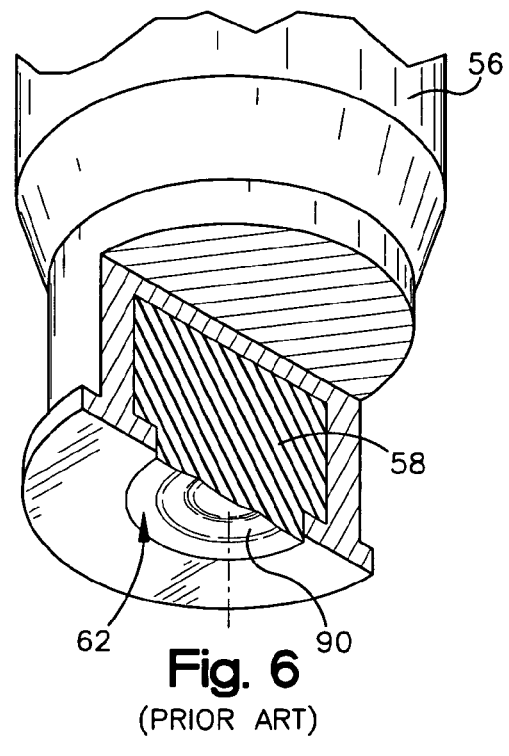
FIG. 6 is a perspective view, partially in section, of another component of the solenoid valve of FIG. 3, showing an armature having a deformed seal surface.

In a normal position, the valve is biased closed. To open the valve, a magnetic force is created by the solenoid coils 52 to allow pressurized air to flow through the valve. This magnetic force attracts an armature assembly 55, best seen in FIG. 4, to move in a vertical direction. The armature assembly 55 includes a spring 76 and a conventional armature 56 having typical magnetic strength, e.g., a "5 times" magnetic power. The valve includes a pole piece 57 that is typically constructed of cold rolled steel or similar material. The pole piece 57 has an internal air passageway 59. The pole piece attracts an armature 56. A seal member 58 is contained within a bottom portion of the armature 56. The seal member 58 has a flat sealing surface 62, as best seen in FIG. 6.

As the valve is repeatedly opened and closed, the armature 56 travels vertically up and down along the axis $A_1$ shown in FIG. 3. In this and other prior art designs, maintaining alignment of the sealing surface 62, and therefore the armature 56, is a significant design concern. Without proper alignment, the valve will not seal. As a result, the valve assembly 50 includes an armature guide sleeve 66 in which the armature 56 travels. The guide sleeve 66 is typically made of brass or another similar material. The cylindrical shaped guide includes a thin-walled inner surface 68 that is contiguous with the armature. A horizontal stop surface 70 of the pole piece 57 further limits movement of the armature when the magnetic field is generated. The sleeve member 66 is included in prior art designs to maintain alignment of the armature about the $A_1$ axis and to increase sealing performance of the valve assembly 50.

As directed by the controller, the modulator will discontinue electric current to the solenoid coils 52 to effectively deactivate the magnetic field. Once the field is removed, a compressed spring 76 (see FIG. 4) disposed around the exterior of the armature is allowed to uncoil in a direction away from the horizontal stop surface 70 of the pole piece 57. The spring 76 motion forces the seal surface 62 in contact with a valve seat insert 80. The valve seat insert 80 is mounted within a top cavity of a valve housing 81.

Figure 4:
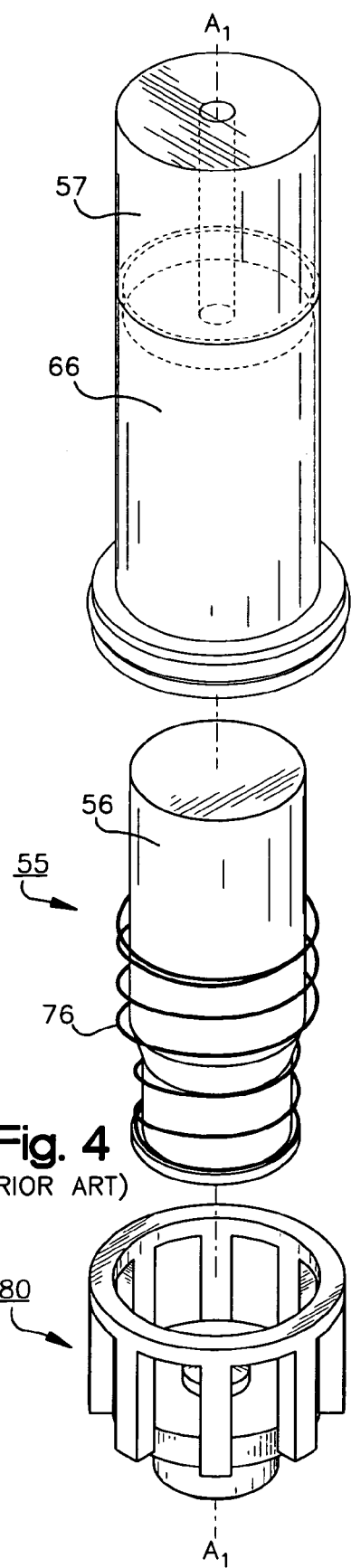
FIG. 4 is an exploded assembly view of certain components of the solenoid valve of FIG. 3.

Referring to FIG. 4, an exploded assembly view of certain components of the prior art solenoid valve of FIG. 3 are illustrated. Axial alignment of the guide sleeve 66, the armature 56 and the valve seat insert 80 is necessary for desired seal performance. However, this design creates inherent problems regarding seal integrity over the life cycle of the valve.

Figure 5:
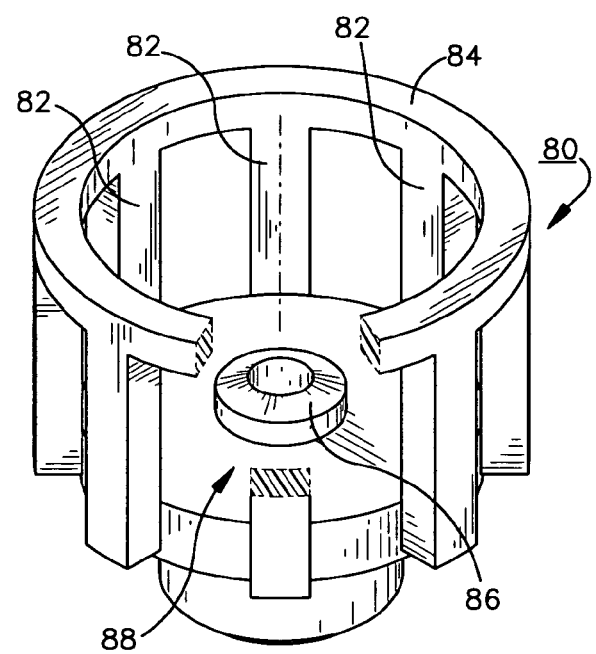
FIG. 5 is a perspective view, partially in section, of one component of the solenoid valve of FIG. 3, showing a valve seat having a central rimmed surface.

A perspective view of the insert 80 is shown in FIG. 5. The insert 80 includes a top portion that defines a partially walled cavity into which a bottom portion of the armature inserts when the valve is in a closed position. The cavity is defined by a series of equally spaced vertical columns 82 that support a ring 84. As shown in FIG. 5, a cylindrical rim 86 protrudes vertically from the cavity bottom surface 88. A raised rim is utilized to achieve a seal if after use the armature becomes axially misaligned from the valve seat insert. Misalignment during operation will result in leakage of the valve 50. However, repeated contact with the rim 86 deforms the seal which is detrimental to the seal integrity of the sealing member surface 62.

Referring now to FIG. 6, a perspective view of the bottom surface of the armature assembly 55 is shown. As shown, the seal surface 62 includes deformation in the form of a ring-shaped compression 90. This compression 90 deepens throughout the service life of the valve. It is believed that valve seal performance drops as a results of structural deformation of the sealing member surface 62.

Present Invention

Figure 7A:
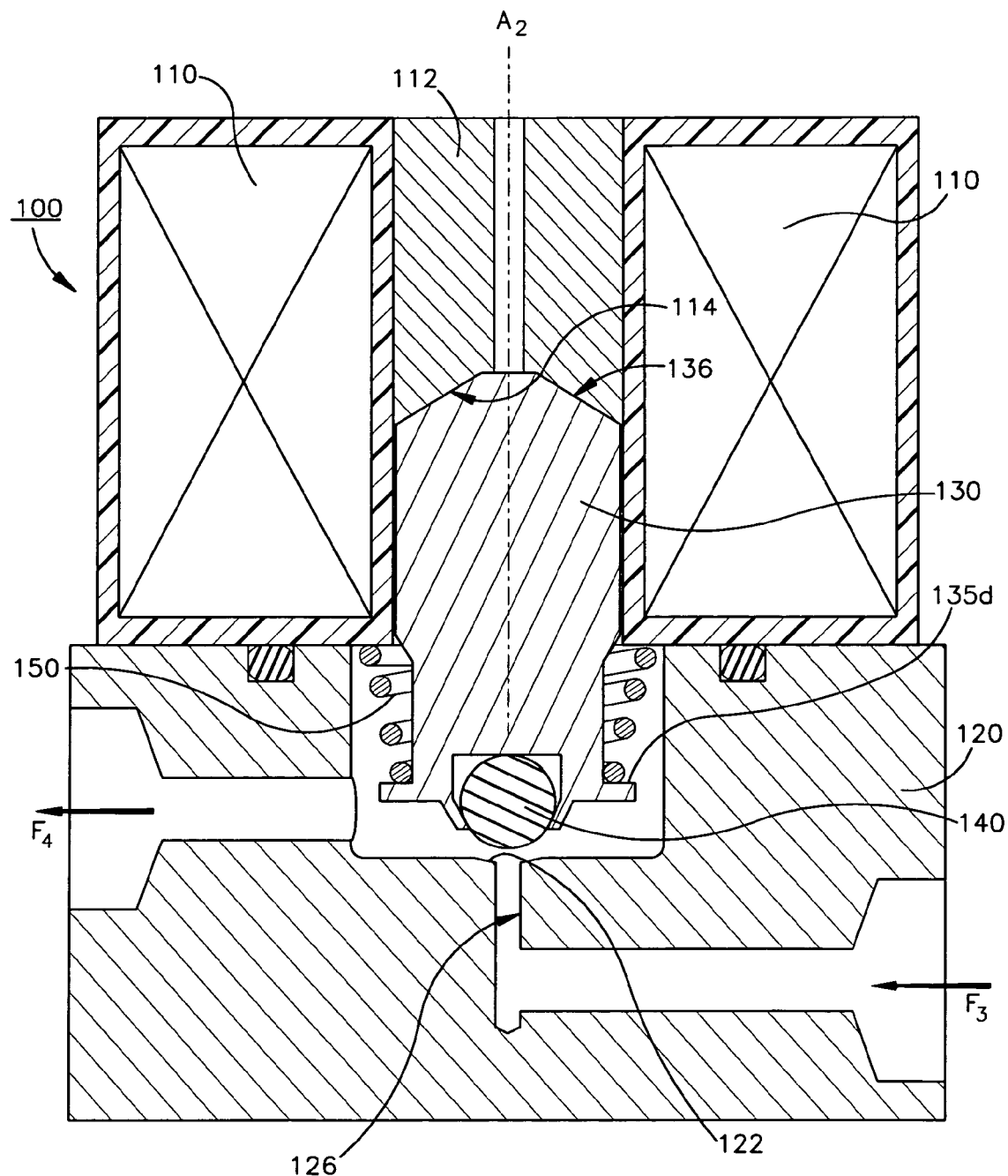
FIG. 7A a cross-sectional view of a solenoid valve made in accordance with one embodiment of the present invention, showing the valve in an open position.

Referring now to the FIG. 7A, a cross-sectional view of a solenoid valve assembly 100 made in accordance with one embodiment of an apparatus showing aspects of the present invention is shown. The present invention is a new and improved valve that seals when axially misaligned or deformed. The valve utilizes a ball with resilient properties rather than a steel ball conventional in many valve designs. The valve seat is a high-tolerance and reproducible machined surface. The resilient ball itself is contained within one end of the armature. Consequently, the design has reduced manufacturing costs and increased reliability.

The valve assembly 100 controls the flow of pressurized air from an input path $F_3$ shown to an output path $F_4$ as illustrated in FIG. 7A. As shown, the valve assembly 100 is a supply solenoid shown in an open position. It should be understood by others with ordinary skill in the art that the present invention can be practiced with alternative flow patterns and varying valve constructions, e.g., a check valve or any valve construction having a pneumatic core. In other words, the principles of the present invention are applicable to pneumatic controlled valves and are not limited to solenoid actuated valves. Further, the invention is adaptable for use in not only trailer and truck braking and parking systems, but in other suitable heavy vehicles as well. In addition, the invention is applicable to other pneumatic systems on a vehicle requiring electromagnetic control of a compressed air delivery.

The valve 100 relies upon electromagnetic actuation to open and close to control the flow of pressurized air. The valve includes a solenoid coil assembly 110 for producing a magnetic field when energized by a flow of electric current. The coil assembly includes a pole piece 112 that is centrally mounted in a location surrounded within the coil assembly 110. The pole piece 112 is preferably constructed of cold rolled steel or similar material. As shown, a bottom surface 114 of the pole 112 is concave conical shaped. Other shapes, such as convex or planar may be used in the practice of this invention. To be discussed later in greater detail, this shape promotes alignment of valve components.

Figure 7B:
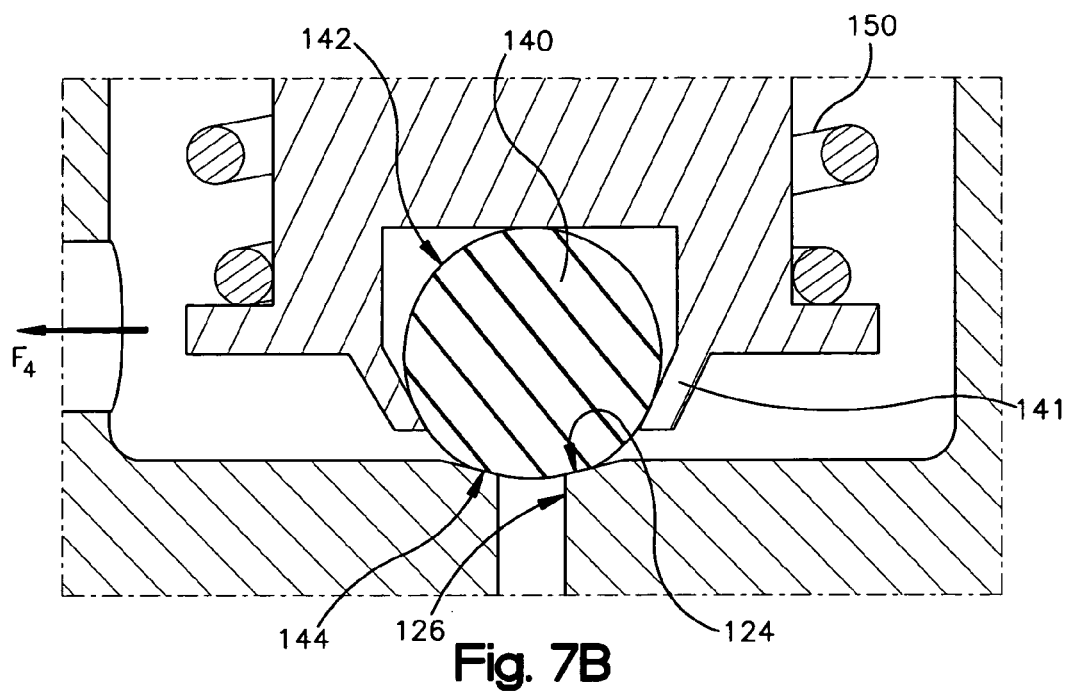
FIG. 7B is an enlarged cross-sectional view of a portion of the solenoid valve of FIG. 7A, showing the valve in a closed position.

A valve housing 120 includes a valve seat 122 centered about axis $A_2$ as shown in FIG. 7A. The valve seat has a shallow concave conical shape and defines a valve seat surface 124, as best seen in FIG. 7B. The valve seat 122 can be formed by a conventional drilling operation and requires no additional inserts or modifications. A hole in the center of the valve seat defines an inlet flow passage having internal walls 126.

Figure 7C:
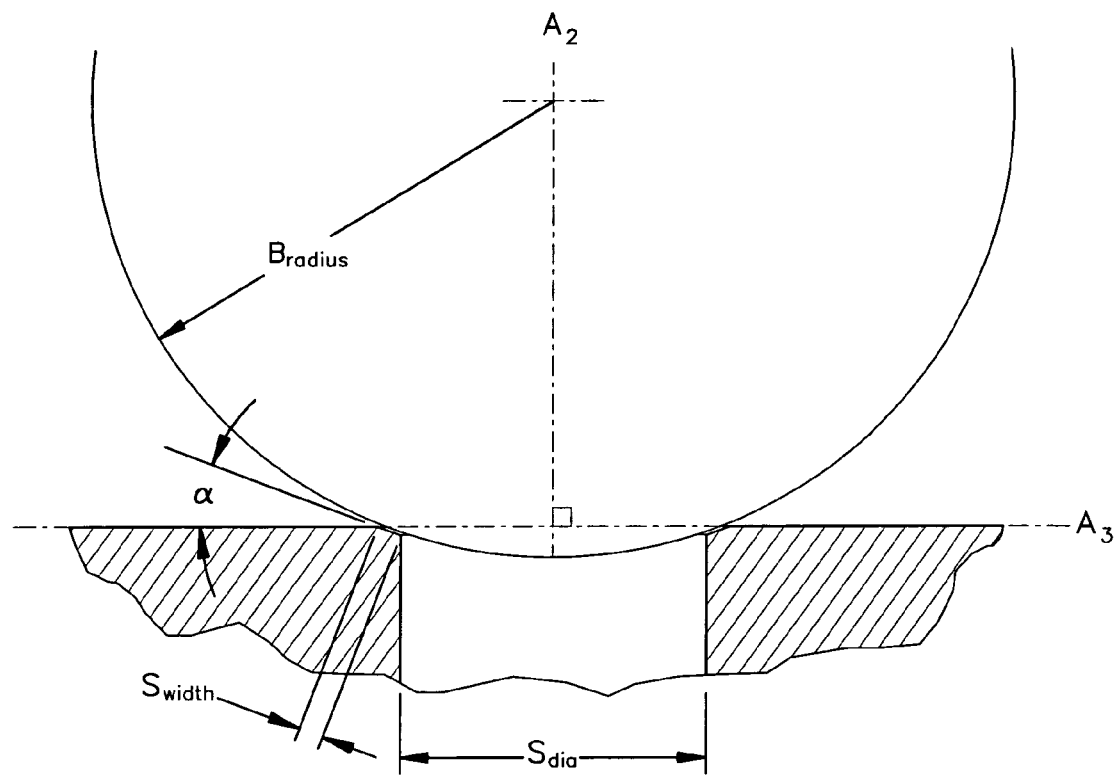
FIG. 7C is an enlarged cross-sectional view of a portion of a solenoid valve made in accordance with the present invention, showing an alternative valve seat construction.
Figure 7D:
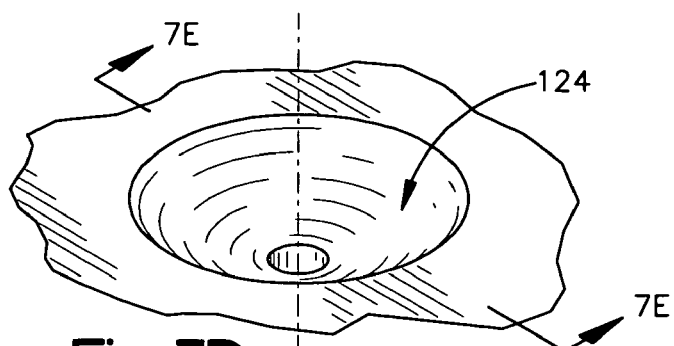
FIG. 7D is a fragmentary perspective view of a portion of a solenoid valve made in accordance with the present invention, showing yet another alternative valve seat construction.

It should be understood by others with ordinary skill in the art that seat shapes alternative to the shape illustrated in FIG. 7A may be utilized in the practice of this invention. For exemplary purposes, one such seat design is shown in FIG. 7C. In this seat design, the conical surface has been reduced to a sharp edge with a limited horizontal component. Further, as shown in FIG. 7D, the valve seat surface 124 can be non-planar.

Figure 8:
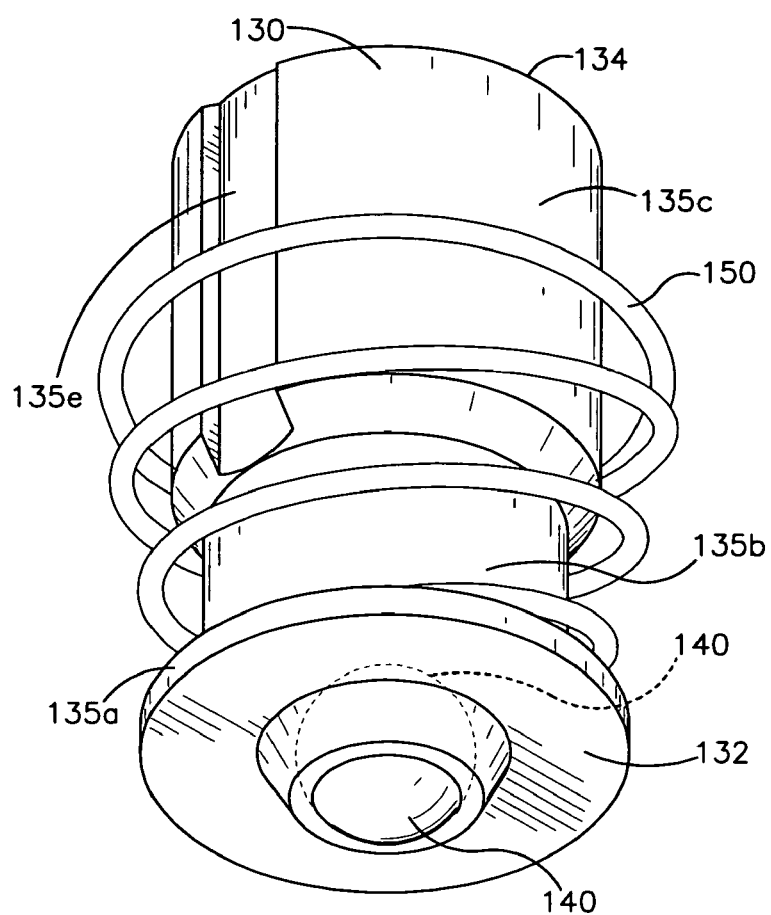
FIG. 8 is perspective view of one assembly component of the solenoid valve of FIG. 7A.

Referring again to FIG. 7A, the valve assembly 100 includes an armature 130. The armature is a solid rod-shaped core having a first end 132 (see FIG. 8) positioned adjacent the valve seat 122 and a second end 134 positioned adjacent the pole piece 112. Preferably, the armature 130 includes three distinct portions, a first portion 135a, a second portion 135b and a third portion 135c, as best seen in FIG. 8. The first portion 135a has a first diameter. The second portion 135b has a second diameter less than the first diameter and defines a shoulder 135d (see FIG. 7A) between the first and second portions 135a, 135b. As illustrated, the shoulder 135d prohibits movement of a spring 150 in one direction along the $A_2$ axis. The third portion 135c has a third diameter greater than the second diameter. A groove 135e extends throughout the longitudinal length of an exterior surface of the third portion 135c.

As discussed, the armature includes a second end 134. More particularly, the second end 134 includes a convex conical surface sized and shaped to cooperatively mate with the bottom surface 114 of the pole piece 112. As seen in FIG. 7A, this cooperative mating aligns the armature 130 about the $A_2$ axis when the valve is closed without the use of a separate guide member or other guiding structure. In an open position, the gap between the bottom surface 114 and top surface 136 may be 0.022 inches, but can vary within the scope of the present invention.

The first end 132 of the armature 130 contains a spherical shaped seal 140. As shown, the seal is a ball having elastomeric properties to be discussed later in detail. The seal is held within a void in the first end 132 by a ring 141 (see FIG. 7B) having inward biased walls. The seal 140 can be slightly compressed within the void, but not so that it can be manually removed. The seal 140 has a uniform outer surface 142 when not compressed. As shown in FIG. 7B, the seal 140 is sized to engage the conical surface 124 of the valve seat 122 to block air flow through the inlet flow passage. FIG. 7B shows an exploded cross-sectional view of the valve of FIG. 7A in a closed position. As clearly seen, the diameter of the seal 140 exceeds the diameter of the inlet flow passage 126. In this closed position, the seal 140 compresses and a portion 144 of the seal surface 142 that is contiguous with the valve seat surface 124 cooperatively mates to the seal surface 142 to seal air flow. As shown, the ball actually flattens under the force of a spring to seal with a portion of the seat surface 124. If the armature 130 is axially misaligned with the internal passage defined by the inner walls 126, the diameter and shape of the ball 140 is sufficient to maintain a seal.

Referring again to the elastomeric seal 140, as shown the seal is a ball having elastomeric properties. A ball of any suitable diameter may be used. In one embodiment, the ball has a diameter from 0.106 to 0.206 inches. Preferably, the ball has a diameter from 0.146 to 0.166 inches. More preferably, the ball has a diameter of 0.156 inches.

The ball is constructed of a elastomeric material having certain physical properties that are ascertainable from established ASTM methods. The material should have a tensile strength of at least 1500 psi. The material should have elongation properties of at least 200%. Preferably, the material should have elongation properties of at least 250%. The material has a durometer Shore A test value from 65 to 75 points. The seal material should respond favorably to fluid aging testing with limited change in durometer data, tensile strength and elongation. One ASTM method test of a seal material found a change in durometer data of −5 to +15 points, a change in tensile strength of −20%, and a change in elongation of −40%.

The valve 100 includes a coil spring 150 that biases the valve closed under normal conditions. Referring to FIG. 8, a perspective view of the spring 50 engaged around the exterior of the armature 130 is shown. Preferably, the spring is constructed of a non-magnetic material. However, the invention may be practiced with a magnetic spring. When the solenoid coil assembly is de-energized, the coil spring resiliently uncoils in the direction of the valve seat 122. The spring force of the coil 150 may vary but must be of a magnitude to sufficiently seal the valve to industry standards in the art, but not sufficient enough to resist the magnetic force generated by the solenoid coil assembly 110. Therefore, the coil assembly when energized displaces the armature 130 to an open position away from the valve seat to allow air flow through the inlet flow path $F_3$ to the exit flow path $F_4$. In contrast, air flow is blocked between the inlet flow path $F_3$ and the exit flow path $F_4$ when the coil assembly is not energized.

Referring now to FIG. 7C, an enlarged cross-sectional view of a portion of a solenoid valve made in accordance with the present invention is shown. As discussed, it should be understood by others with ordinary skill in the art that the present invention can be practiced with alternative flow patterns and varying valve constructions. The valve shown includes an alternative valve seat construction. The valve seat is more sharp than the construction illustrated in FIGS. 7A and 7B. In the practice of the present invention, various valve seat sizes and dimensions may be used.

In the embodiment illustrated in FIG. 7C, the valve seat has a surface width $S_{width}$, or contact gland size, from 0.001 to 0.010 inches. Preferably, the valve seat has a surface width $S_{width}$ from 0.002 to 0.004 inches. More preferably, the valve seat has a surface width $S_{width}$ of 0.003 inches.

In the embodiment illustrated in FIG. 7C, the valve seat has a diameter $S_{dia}$ from 0.040 to 0.064 inches. Preferably, the valve seat has a diameter $S_{dia}$ from 0.048 to 0.056 inches. More preferably, the valve seat has a diameter $S_{dia}$ of 0.052 inches.

In the embodiment illustrated in FIG. 7C, the valve seat defines a plane at an angle α from an axis perpendicular $A_3$ to a longitudinal axis $A_2$ of the inlet flow passage defined by the valve seat. Preferably, α is between 6 and 36 degrees. More preferably, α is between 18 and 24 degrees.

Figure 7E:
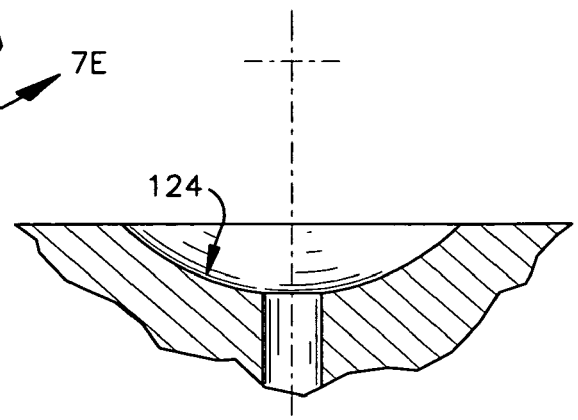
FIG. 7E is a cross sectional view of the valve seat of FIG. 7D, shown along a plane represented by the line 7E-7E in FIG. 7D.

As discussed, the valve seat surface may be of various constructions. Referring now to FIG. 7D, a fragmentary perspective view of a portion of a solenoid valve having yet another alternative valve seat construction is shown. A cross sectional view of this valve seat is shown in FIG. 7E along a plane represented by the line 7E-7E in FIG. 7D. As illustrated, the valve seat surface is spherical shaped. The shape of the surface may cooperate to mate with the surface of the spherical seal 140. It should be understood by others with ordinary skill in the art that other annular shapes that are not spherical may be used in the practice of this invention.

Method of Operation

A method of controlling pressurized air flow within a pneumatic braking system modulator is disclosed. The method includes providing a solenoid valve 100 of the present invention. In light of the reality that a method of controlling air flow in a pneumatic braking system may be a repetitive cycle of serial method steps, the method of the present invention will be described for exemplary purposes from an arbitrary start to an arbitrary finish of one method step series.

As discussed, FIG. 7B shows a valve assembly 100 in a closed position. The valve may be held in this position during normal driving operations when the solenoid coil is not energized. In this illustrated valve position, pressurized air flow between the inlet flow path $F_3$ to and the exit flow path $F_4$ is blocked.

This representative air flow pattern continues until the controller sends a message to the modulator to open this valve and allow air flow through the valve. For example, this signal may be part of an ABS stopping procedure. The controller signal to open the valve initially results in the solenoid coils 110 being energized and a magnetic field being generated. Once generated, the magnetic field creates a force between the pole piece 112 and the armature 130. The magnetic force pulls the armature 130 toward the pole piece 112 until the surfaces 114, 136 are contiguous. In this position, the spring 150 is increasingly compressed. This open position is illustrated in FIG. 7A. As shown, the seal member 140 is no longer contiguous with the valve seat and air flows through the inlet flow path $F_3$ to and through the exit flow path $F_4$.

This representative air flow pattern continues until the controller sends a message to the modulator to close this valve and prohibit air flow through the valve. This signal may be initially generated by a driver applying the service or parking brake. Electric current is discontinued to the solenoid coils to remove the magnetic field. In the absence of the magnetic field, the armature 130 is no longer attracted to the pole piece 112. As a result, the spring 150 uncoils from its compressed position. The spring forces the armature 130 toward the valve seat 122 until the ball seal 140 contacts the valve seat surface 124. The spring force is sufficient to compress the ball 140 so that a portion of its outer surface 142 is deformed. This temporary deformation forms a seal between the ball seal 140 and the seat surface 124 to effectively block air flow through the flow passage 126. This method step once completed results once again in the valve orientation shown in FIG. 7B.

The seal remains until the beginning of the series of method steps is initiated by the controller.

While several embodiments of the invention have been illustrated and described in considerable detail, the present invention is not to be considered limited to the precise construction disclosed. Various adaptations, modifications and uses of the invention may occur to those skilled in the arts to which the invention relates. It is the intention to cover all such adaptations, modifications and uses falling within the scope or spirit of the claims filed herewith.

What is claimed is:

1. A solenoid valve for use in a heavy vehicle pneumatic system, the valve having an exit flow passage and comprising:
    a) a solenoid coil assembly comprising a pole piece and controllable to produce a magnetic field when energized;
    b) a valve seat defining an inlet flow passage, wherein the valve seat defines a plane at an angle between about 6 degrees and less than 35 degrees from an axis perpendicular to a longitudinal axis of the inlet flow passage;
    c) an armature having a first end and a second end, wherein said first end defines a cavity within which a spherical shaped elastomeric seal is disposed, said first end including a generally conical nose that retains said spherical shaped elastomeric seal within said cavity; said spherical shaped elastomeric seal configured to engage said valve seat and elastically deform to block air flow through said inlet flow passage; and
    d) a spring engaged around an exterior of said armature that resiliently biases said armature toward said valve seat when said solenoid coil assembly is de-energized;
    e) wherein said coil assembly displaces said armature to an open position away from said valve seat and toward said pole piece to allow air flow through said inlet flow passage to said exit flow passage as a function of whether said coil assembly is energized.

2. The solenoid valve of claim 1 wherein said armature first end defines a upstream facing circular-shaped first surface.

3. The solenoid valve of claim 2 wherein the spherical shaped elastomeric seal abuts a center point of said first surface and is held against said first surface by said generally conical nose.

4. The solenoid valve of claim 1 wherein said second end of said armature has a surface that cooperatively mates with a surface on said pole piece to axially align said armature with said pole piece.

5. The solenoid valve of claim 4 wherein said second end of said armature includes a concave portion that cooperatively mates with a convex portion on said pole piece.

6. The solenoid valve of claim 1 wherein at least a portion of said valve seat surface is spherical-shaped.

7. The solenoid valve of claim 1 wherein a diameter of said valve seat is from 0.040 to 0.064 inches.

8. The solenoid valve of claim 1 wherein a diameter of said valve seat is from 0.048 to 0.056 inches.

9. The solenoid valve of claim 1 wherein said seal is a ball having a diameter from 0.106 to 0.206 inches.

10. The solenoid valve of claim 1 wherein said seal is a ball having a diameter from 0.146 to 0.166 inches.

11. The solenoid valve of claim 1 wherein said seal is constructed of a material having a durometer Shore A test value from 65 to 75 points.

12. The solenoid valve of claim 1 wherein said seal is constructed of a material having a tensile strength of at least 1500 psi.

13. The solenoid valve of claim 1 wherein said seal is constructed of a material having an elongation property of at least 200%.

14. The solenoid valve of claim 1 wherein said seal is constructed of a material having an elongation property of at least 250%.

15. The solenoid valve of claim 1 wherein said inlet flow passage is blocked when said valve seat and said armature are contiguous in an axially misaligned position.

16. The solenoid valve of claim 1 wherein said armature first end defines a upstream facing circular-shaped first surface, wherein said spherical shaped elastomeric seal is attached at a center point of said first surface.

17. The solenoid valve of claim 4 wherein said second end of said armature includes a convex portion that cooperatively mates with a concave portion on said pole piece.

18. The solenoid valve of claim 1 wherein a distal end of said generally conical nose engages the spherical shaped elastomeric seal to retain the seal within the cavity.

19. A heavy vehicle braking and parking system comprising:
    a) a compressor for generating a supply of air under pressure;
    b) a reservoir for storing the air under pressure;
    c) a pneumatic brake chamber for selectively engaging and disengaging a brake;
    d) a modulator that selectively supplies the air under pressure to the brake chamber to engage and disengage the brake; and
    e) at least one solenoid valve disposed within the modulator for controlling air flow within the modulator, said at least one solenoid valve comprising:
        i) a solenoid coil assembly for producing a magnetic field;
        ii) a valve seat defining an inlet flow passage, wherein the valve seat defines a plane at an angle between about 6 degrees and less than 35 degrees from an axis perpendicular to a longitudinal axis of the inlet flow passage;
        iii) an armature having an upstream facing end defining a cavity within which a spherical shaped elastomeric seal is disposed, said first end including a generally conical nose that retains said spherical shaped elastomeric seal within said cavity; said spherical shaped elastomeric seal configured to engage said valve seat and elastically deform to block air flow through said flow passage; and
        iv) a spring engaged around an exterior of said armature that resiliently biases said armature toward said valve seat to a closed position;
        v) wherein said magnetic field displaces said armature to an open position away from said valve seat to allow air flow through said flow passage.

20. The heavy truck braking system of claim 19 wherein at least a portion of said valve seat surface is concave shaped.

21. The heavy truck braking system of claim 19 wherein said upstream facing end defines a circular-shaped surface, wherein said spherical shaped elastomeric seal is attached at a center point of said surface.

22. The solenoid valve of claim 19 wherein said flow passage is blocked when said valve seat and said seal are mated in an axially misaligned position.

23. A method of controlling pressurized air flow within a pneumatic system modulator, comprising the steps of:
 a) providing a solenoid valve comprising:
  i) a valve seat defining an inlet flow passage, wherein the valve seat defines a plane at an angle between about 6 degrees and less than 35 degrees from an axis perpendicular to a longitudinal axis of the inlet flow passage;
  ii) an armature comprising an upstream facing end defining a cavity within which an elastomeric ball is disposed, said upstream facing end including a generally conical nose that retains said elastomer ball within said cavity; said elastomer ball configured to engage said valve seat and elastically deform to block air flow through said passage;
  iii) a spring that biases said armature in a direction of said valve seat surface, wherein said coil is engaged around an outer longitudinal surface of said armature; and
  iv) a solenoid coil, wherein a portion of said armature is positioned within a center guide of said coil;
 b) actuating said armature by energizing said solenoid coil;
 c) pulling said armature in a direction opposite said valve seat to permit air flow through said opening;
 d) removing said magnetic field to permit said spring to bias said armature toward said valve seat surface; and
 e) blocking air flow through said opening with said spherical shaped seal.

24. The method of claim 23 wherein the step of providing a solenoid valve comprises machining a concave surface in a center of said valve seat surface.

25. The method of claim 23 wherein the step of pulling said armature in a direction opposite said valve seat to permit air flow through said flow passage comprises guiding said armature within a guide cavity within said solenoid coil.

26. The method of claim 23 wherein the step of blocking air flow through said flow passage reduces air flow through the passage to less than 2.5 cc/minute.

27. A solenoid valve for use in a heavy vehicle pneumatic braking and parking systems, the valve having an exit flow passage and controllable between an open position and a closed position, said valve comprising:
 a) a solenoid coil assembly controllable to produce a magnetic field when energized and comprising a pole piece having an axial bore and an concave surface;
 b) a valve seat defining an inlet flow passage, wherein the valve seat defines a plane at an angle between about 6 degrees and less than 35 degrees from an axis perpendicular to a longitudinal axis of the inlet flow passage;
 c) a cylindrical shaped armature axially aligned with said pole piece and having opposing first and second end faces, a first portion having a first diameter, a second portion having a second diameter less than said first diameter and defining a shoulder between said first and second portions, and a third portion having a third diameter greater than said second diameter, wherein a groove extends throughout a longitudinal length of said third portion on an exterior surface thereof; and wherein said first portion defines an upstream facing cavity;
 d) a spherical shaped elastomeric seal fixedly mounted within said cavity by a generally conical nose integrally formed with said first portion; said spherical shaped elastomeric seal configured to elastically deform against said valve seal surface when said valve is in said closed position to seal said inlet flow passage; and
 e) a coil spring having a first end in contact with said shoulder and a second end resiliently extending to and about an outer surface of said third portion, wherein said spring resiliently biases said armature toward said valve seat;
 f) wherein said coil assembly displaces said armature to said open position away from said valve seat and toward said pole piece to allow air flow through said inlet flow passage to said exit flow passage as a function of whether said coil assembly is energized; and
 g) wherein said second end of said armature has a convex surface that cooperatively mates with said concave surface on said pole piece to axially align said armature with said pole piece.

\* \* \* \* \*